(No Model.)

E. P. DREW.
ADJUSTABLE WRENCH.

No. 591,743. Patented Oct. 12, 1897.

WITNESSES

INVENTOR
Edmond P. Drew,
By John Hedderburn
Attorney

UNITED STATES PATENT OFFICE.

EDMOND P. DREW, OF GLENVILLE, OHIO.

ADJUSTABLE WRENCH.

SPECIFICATION forming part of Letters Patent No. 591,743, dated October 12, 1897.

Application filed January 15, 1897. Serial No. 619,312. (No model.)

*To all whom it may concern:*

Be it known that I, EDMOND P. DREW, a citizen of the United States, residing at Glenville, in the county of Cuyahoga and State of Ohio, have invented certain new and useful Improvements in Adjustable Monkey-Wrenches; and I do hereby declare the following to be a full, clear, and exact description of the invention, such as will enable others skilled in the art to which it appertains to make and use the same.

This invention relates to improvements in wrenches, and has more particular relation to adjustable nut-wrenches.

The invention consists of the combination, with the hollow body portion having a rigid jaw and slots formed in its side walls, of a sliding jaw provided with spaced notched tines and adapted to be slid into the body portion and an adjusting-nut mounted in the hollow body portion and engaging said notched tines to lock the sliding jaw in its adjusted position.

The invention also consists of certain other novel constructions, combinations, and arrangements of parts, all of which will be hereinafter more particularly set forth and claimed.

Figure 1:
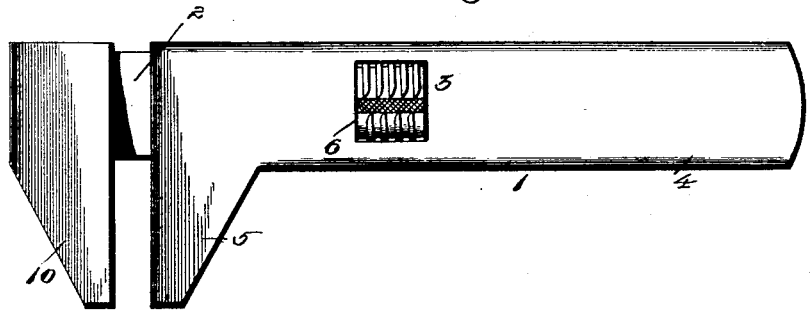
Figure 2:
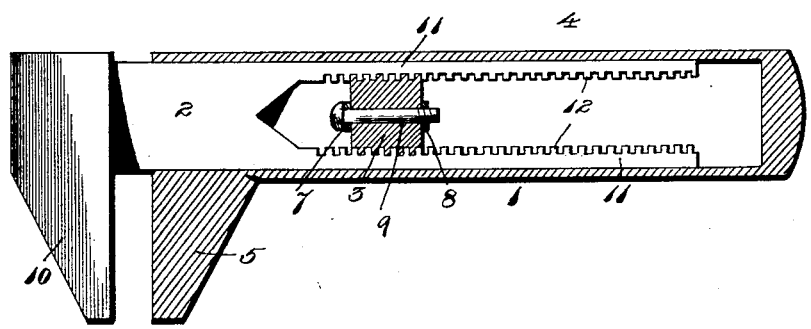
Figure 3:
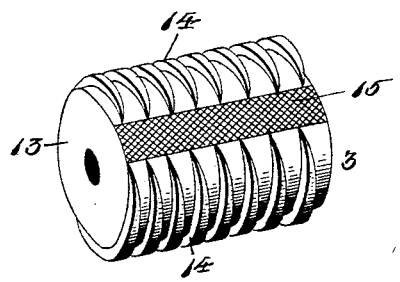

In the accompanying drawings, Figure 1 is a side elevation of the wrench. Fig. 2 is a vertical horizontal section. Fig. 3 is a detail perspective view of the locking-nut.

1 in the drawings represents the body portion of the wrench, 2 the sliding jaw, and 3 the locking-nut. Said body portion 1 comprises an extended hollow handle 4, having a rigid jaw 5 formed at one end of the same. Said handle is also formed with side slots 6 and internal apertured cross-bars 7 8, the latter having a screw-threaded aperture for the reception of the end of a headed screw-threaded bolt 9, the use of which will be hereinafter more particularly described.

The sliding jaw 2 comprises a jaw proper, 10, and two parallel tines 11, formed with projections 12 upon their inner faces, the projections of one tine occupying positions in vertical planes lying midway between the projections of the other tine. These tines 11 are adapted to slip into the hollow handle 4 and pass downward upon each side of the cross-bars 7 and 8. The locking-nut 3 comprises a cylindrical nut proper, 13, formed with a plurality of peripheral semicircular threads 14, the ends of said threads terminating upon each side of said drum and leaving a clear unthreaded portion 15, the surface of which is suitably milled to prevent slipping of the fingers thereon. The said threads are of varying depth, being of less height near their ends than at their middles, so that as the nut 3 is rotated when placed upon the bolt 9 said threads will enter the grooves between the projections 12 of the tines 11, and thus jam in said grooves and hold the nut from rotation and the sliding jaw tightly in position in the body portion 1. When it is desired to adjust said sliding jaw, the nut 3 is rotated until the tines correspond with the unthreaded portions 15, when said sliding jaw may be slid longitudinally to any desired adjusted position. The locking-nut is then rotated, which causes the threads 14 to enter the grooves between the projections 12 and bind therein and lock the sliding jaw in its adjusted position. The ends of the threads of one half of the drum 13 terminate at points midway between the threads upon the opposite half of the drum, so that when said nut 3 is rotated its respective threads will enter the grooves between the projections 12 upon the respective tines in the proper manner. The threads 14 are also tapered from their middles toward their ends in width, so that after the sliding jaw has been adjusted to approximately the desired position these tapered threads will tend to bind it firmly against the nut upon which it is placed when the locking-nut 3 is rotated. Should the threads of the locking-nut become worn upon one side, so as not to firmly bind the sliding jaw against the nut, the said nut 3 may be reversed on its pivot-bolt and thus bring the opposite sides of the threads into engagement with the projections upon the tines 11.

By the peculiar construction of my improved wrench it is not necessary when it is desired to adjust the wrench to rotate the nut 3 more than a quarter-revolution, which action leaves the sliding jaw free to be moved by hand to the desired position. I also obviate the annoying necessity of moving the jaw by continued rotation of the nut, which is necessary with many constructions now on the market. The threads 14 of the locking-nut 3 are given a slight inclination from front to rear, so that the tines will be given a slight movement upon the rotation of said nut.

Having thus described my invention, what I claim as new, and desire to secure by Letters Patent, is—

1. In a wrench the combination with a hollow body portion having a rigid jaw and slotted side walls, of a sliding jaw provided with spaced notched tines adapted to slide into said body portion, and a locking-nut mounted in said body portion and adapted to engage the notches of the respective tines to lock the same in position, substantially as described.

2. In a wrench, the combination with a hollow body portion having a rigid jaw and slotted side walls, of a sliding jaw having spaced notched tines adapted to slide in said hollow body portion, and a rotatable locking-nut mounted in the hollow body portion and projecting through the slotted side walls of the same and provided with threads adapted to engage the notches of the tines and thus lock the sliding jaw in its adjusted position, substantially as described.

3. In a wrench, the combination with a hollow body portion having a rigid jaw and slotted side walls, of a sliding jaw provided with spaced notched tines adapted to be applied within the hollow body portion, of a rotatable nut mounted in said hollow body portion and projecting through the slotted side walls and formed with a plurality of spaced tapering threads adapted to engage the notches of the tines and bind against the same to lock the sliding jaw in its adjusted position, substantially as described.

4. In a wrench, the combination with a hollow body portion having a rigid jaw and slotted side walls, of a sliding jaw provided with spaced notched tines adapted to slide within the hollow body portion, and a rotatable locking-nut mounted in said hollow body portion and projecting through the slotted side walls of the same and formed with a plurality of threads which cover only a portion of its periphery whereby upon the rotation of said nut the tines are either left free to slide or are locked in their adjusted position, substantially as described.

5. In a wrench, the combination with a body portion having a rigid jaw, of a sliding jaw provided with spaced notched tines adapted to slide on said body portion, and a locking-nut mounted in said body portion and adapted to engage the notches of the respective tines to lock the sliding jaw in its adjusted positions, substantially as described.

In testimony whereof I have signed this specification in the presence of two subscribing witnesses.

EDMOND P. DREW.

Witnesses:
MICHAEL HORVATH,
JOHN H. HOGG.